March 13, 1951 A. MULLER ET AL 2,544,801
WELDING GUN

Filed July 14, 1950 2 Sheets-Sheet 1

INVENTORS
ALBERT MULLER
GLENN J. GIBSON
BY
ATTORNEYS

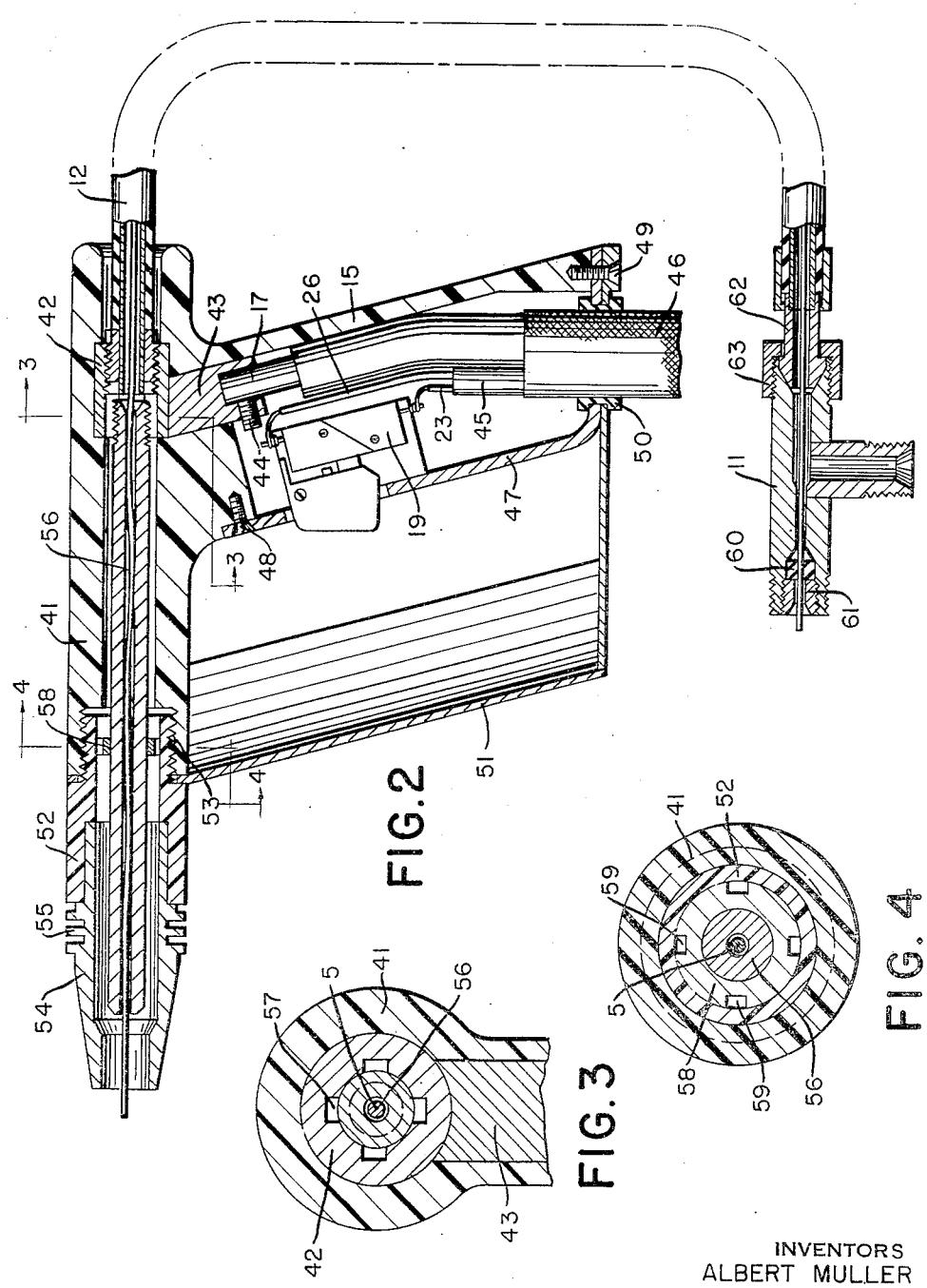

Patented Mar. 13, 1951

2,544,801

UNITED STATES PATENT OFFICE 2,544,801

WELDING GUN

Albert Muller, Plainfield, and Glenn J. Gibson, New Providence, N. J., assignors to Air Reduction Company, Incorporated, New York, N. Y., a corporation of New York Application July 14, 1950, Serial No. 173,743

8 Claims. (Cl. 219—8)

1

This invention relates to electric welding methods and apparatus and particularly to apparatus adapted to feed a wire electrode continuously to an arc of the gas-shielded type. This application forms a continuation-in-part of our copending application Serial No. 35,936, filed June 29, 1948, and now abandoned.

The method of electric welding with non-consumable electrodes and a shielding gas such as argon or helium is well known. However, no satisfactory apparatus has been available heretofore whereby a continuously fed consumable electrode can be employed with an inert gas-shielded arc.

It is, therefore, an object of this invention to provide a simple and satisfactorily operable apparatus for welding with a consumable wire electrode fed continuously from a source to the point of application, at which point the shielding gas is also supplied. This invention provides an effective inert gas shield for the arc, the gas issuing through a single large orifice surrounding the continuously fed electrode. The flow of the gas is streamlined or laminar to insure adequate shielding by avoiding entrainment of air in the gas stream as it issues from the orifice and envelops the arc.

Other objects and advantages of the invention will be apparent as it is better understood by reference to the following specification and the accompanying drawing in which:

Fig. 2 is a longitudinal section through the welding gun;

Fig. 3 is an enlarged section on the line 3—3 of Fig. 2; and

Fig. 4 is an enlarged section on the line 4—4 of Fig. 2.

Figure 1:
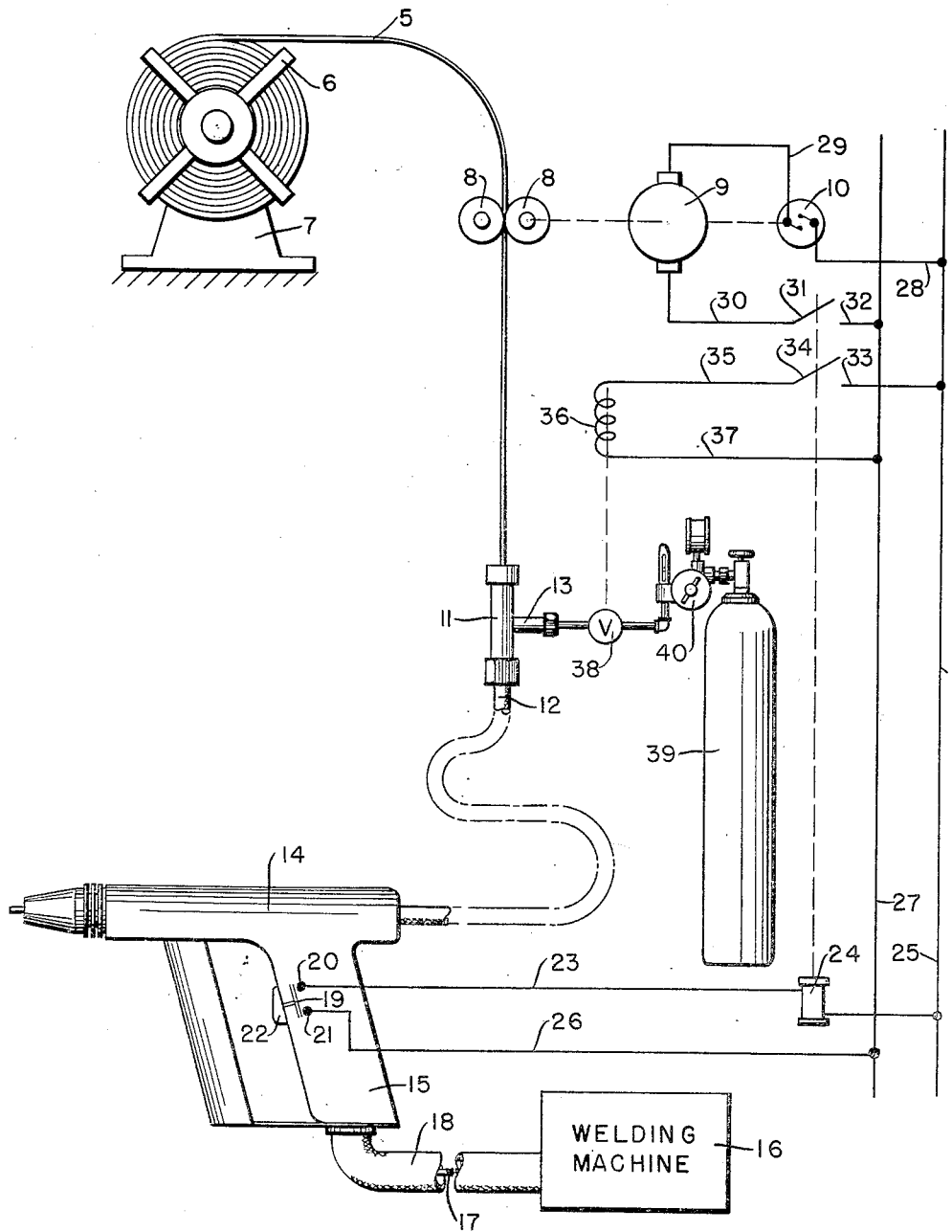
Fig. 1 is a diagrammatic illustration of an apparatus embodying the invention.

In the embodiment of the invention illustrated in the drawings, 5 indicates a bare or wash coated metallic electrode which is withdrawn from a reel 6 revolvably mounted on a bracket 7 and fed by rollers 8, driven by a motor 9. The speed of the motor is controlled by a centrifugal governor as indicated at 10.

The electrode is delivered to a fitting 11 connected to a flexible conduit 12, which may be a rubber covered helically wound steel tube having an internal diameter somewhat larger than that of the electrode 5. A T connection 13 on the fitting 11 provides an inlet for the shielding gas such as helium or argon which is supplied from a suitable source as hereinafter described.

The flexible conduit 12 is connected to one end of a welding gun 14 having a pistol grip 15. Thus the electrode 5 is fed continuously to the welding gun and delivered to the point where the arc is established. The arc is maintained by current from a suitable welding machine 16 such as a welding generator or transformer, which current is delivered to the welding gun by a conductor 17 surrounded by an insulating cover 18.

A switch 19 having contacts 20 and 21 is disposed in the pistol grip 15 and connected to a trigger 22. The contact 20 is connected by a conductor 23 through the solenoid 24 to a conductor 25 which is supplied from a source of current. A conductor 26 is connected to the contact 21 and to a conductor 27, also supplied from a source of current. A conductor 28 connects the conductor 25 to the governor 10 and thence through a conductor 29 to the motor 9. The other pole of the motor 9 is connected by a conductor 30 to a switch member 31 adapted to engage a contact 32 which is connected to the conductor 27. A contact 33, connected to the conductor 25, is adapted to be engaged by a switch member 34 which is connected by a conductor 35 to a solenoid 36. A conductor 37 connects the solenoid to the conductor 27. The switch members 31 and 34 are actuated by the solenoid 24. When the latter is energized, by closing the switch 19, the circuits through the motor 9 and the solenoid 36 are closed. The solenoid 36 actuates a valve 38 which controls the flow of shielding gas from a container such as the cylinder 39 through a pressure reducing valve 40 into the T connection 13, thus supplying shielding gas which flows to and through the welding gun to the point where the arc is established. Thus by actuating the trigger 22, the operator may control the feed of the electrode and the supply of shielding gas.

Referring to Figs. 2–4 inclusive of the drawing, the welding gun 14 consists of a casing 41 of non-conducting material molded, for example, in the conformation of a barrel portion and a handle portion. The conduit 12, through which the electrode wire and shielding gas are fed, enters the opening at the rear end of the casing and is threadedly connected to an electrically conductive block 42 which block has an axial opening to provide passage therethrough of the electrode wire and the shielding gas. A conducting member 43 is secured to the block 42 by silver soldering or otherwise, to afford a low resistance path for the travel of current which is supplied by the conductor 17 held by a screw 44 in the conducting member 43. The switch 19 is supported within the pistol grip 15 and the conductors 23 and 26 are connected thereto. The conductors 23 and 26 within an insulating sheath 45 may be assembled with the conductor 17 within the protective shield 46 so as to facilitate the handling of the welding gun. The pistol grip 15 is closed by a plate 47 secured by screws 48 and 49. An insulating bushing 50 is disposed about the sheath 46. A guard 51 is provided to shield the operator's hand from the intense heat of the arc.

A metallic wire guide and contact tube or current pickup shoe 56 is threaded into the forward end of conducting block 42 by means of an interrupted internal thread in block 42 in such a manner as to extend concentrically within the barrel portion of casing 41, in spaced relationship thereto. As was previously stated, the shielding gas and the electrode wire are both introduced into the gun through flexible conduit 12 which has an end fitting screwed into the back of block 42, so that the wire and gas emerge from the conduit into a central space within the hollow block 42. When the contact tube 56 is screwed into position in the forward end of block 42 the channels 57 between the thread segments of the internal interrupted thread form axial flow passages communicating with the central space in block 42 behind the threaded portion so that the gas emerging from conduit 12 into said space can pass through the channels and flow axially into the annular passage between contact tube 56 and the barrel portion of casing 41. The electrode wire on the other hand passes directly into and through tube 56. Since the internal diameter of contact tube 56 is only slightly larger than the wire diameter, only a small portion of the gas can pass through the contact tube. The inlet end of the wire passage in contact tube 56 is tapered or funneled to facilitate entry of the wire therein when it is initially fed to the gun.

The barrel portion of casing 41 is provided with an extension 52 of electrically non-conducting material which is threadedly secured to the casing at 53. A nozzle 54 of suitable metal such as copper is securely fastened to the barrel extension 52. The barrel extension 52 and the nozzle 54 are concentrically arranged with respect to the contact tube 56 and act therewith to extend the annular gas passage formed between contact tube 56 and the barrel portion of casing 41. The nozzle 54 is supplied with fins 55 to dissipate heat therefrom.

The barrel extension 52 carries a spacer 58 which is provided with channels 59 to permit the flow of gas therebeyond. The spacer 58 has several important functions in this apparatus. Mechanically it serves to support the contact tube 56 concentrically within the barrel extension 52 and thus concentrically within the barrel 41 and nozzle 54 also. In addition, the spacer serves as a gas flow distributing and straightening element. It has been found, in inert gas shielded metal arc welding of the type for which this gun is intended, that a low velocity non-turbulent or laminar flow gas shield is essential to good welding. It is only in a shield of this type that the air is excluded to the substantially complete degree necessary for good welding of all metals. The spacer 58 contributes to the production of such a non-turbulent discharge from the shielding gas nozzle in two ways. First, it acts as a gas distributing element, by virtue of the equally spaced uniformly arranged channels 59. Second, it acts to dissipate non-axial or rotational components of flow in the gas stream and thereby assist in the formation of a laminar flow pattern. The channels 57 in block 42 are also equally spaced and uniformly arranged around the axis of the barrel as a further measure in achieving laminar flow and uniform velocity distribution throughout the cross-sectional flow area at the exit orifice of the annular gas passage.

The gas passage extending from the spacer 58 to the tip of the nozzle 54 is an unobstructed passage of considerable length. It has been established as a result of experimental work that the nozzle diameter at the exit orifice of a welding apparatus constructed in accordance with this invention should be not less than 5 times the wire diameter nor less than 3/8 inch. Experimental work has shown that nozzles having exit orifices of less than 5 wire diameters do not provide adequate shielding for the arc column whereas nozzles of less than 3/8 inch diameter ordinarily do not shield a large enough area for most welding, particularly where manual manipulation is practiced. An example of good practice in this respect is to employ a nozzle with an inside diameter of 5/8 inch when employing a 1/16-inch wire electrode. An example of a preferred form of the invention is shown in Fig. 2, in which the nozzle exit diameter is about 8 times the wire electrode diameter.

The unobstructed terminal portion of the gas passage from the spacer 58 to the exit orifice of the nozzle 54 must be designed with correct length, diameter, and configuration, commensurate with the nozzle diameter selected to produce and deliver a substantially non-turbulent gas shield about the arc. Considering balanced entrance conditions at the inlet end of this passage, such as produced by spacer 58, it has been found necessary to make the length of unobstructed terminal portion of the gas passage not less than 5 times the nozzle diameter, although a ratio of 7 or more as shown in Fig. 2 of the drawing is preferred. The provision of the gas distributing and flow straightening element 58 provides balanced entrance conditions at the inlet end of the unobstructed passage between the said element and the nozzle exit, thus enabling laminar flow to be established in a passage of shorter length than would be required with unbalanced entrance conditions. There is some permissible latitude in the configuration of this portion of the gas passage but it must be streamlined or free of abrupt changes in direction, and/or cross-sectional area. In the gun illustrated, for example, the contact tube 56 terminates a short distance back of the nozzle face. Since this particular contact tube is of relatively thick section, the change in cross-sectional area of the gas passage would be increased at the end of the contact tube if the gas passage were of constant diameter. This would produce expansion and tend to promote turbulence. By reducing the diameter of the nozzle at this point to keep the cross-sectional area approximately constant this may be avoided. However, the change is effected gradually by tapering the walls rather than by abrupt changes in order to maintain the laminar flow lines. In other forms of the invention where the contact tube is thin-walled and also in the form where the contact tube terminates near the face of the nozzle, the nozzle will preferably be straight-walled. In any event the configuration of the terminal portion of the gas passage should be so designed as to insure laminar or non-turbulent flow of the gas as it issues from the nozzle for the normal gas flow ranges of the gun. Good welding practice for a 5/8-inch nozzle requires gas flows in the range of 25 to 60 cu. ft. per hour. This nozzle design is not to be confused with prior art apparatus employing reducing gas atmospheres. Such prior art nozzles have produced high velocity turbulent jets that entrained air, but because of the reducing action of the shielding gas the adverse effect on the weld was minimized. For inert gas shielding with a consumable wire electrode, however, it is necessary to avoid entraining any appreciable amount of air in the stream of gas issuing from the nozzle. Our invention insures the desired results by providing a large, streamlined, low-velocity non-turbulent gas envelope and makes it possible to exclude as much as 99% or more of the ambient air from the arc.

The gas shielded metal arc welding process for which this gun is intended employs relatively large welding currents for the electrodes used. This results in very high electrode burn-off rates. In commercial installations currents of the order of magnitude of 300 amperes or more may be transferred to the electrode wire moving at a rate of the order of 300 or more inches per minute. This requires good electrical contact in order to minimize contact resistance, arcing, and heating. Since the electrode wire is withdrawn from a reel and fed through the welding gun it necessarily possesses some residual curvature. By making the contact tube only slightly larger in inside diameter than the wire and by making the contact tube itself, or the contact tube plus any extensions rearwardly thereof, relatively long with respect to its bore, the residual curvature assures firm brushing contact at two points at least. One contact point will always be at or near the distal end of the contact tube. Since the contact tube is made of copper or other good electrically conducting metal, it will offer a lower resistance path to the welding current than the electrode wire. As a result, a large portion of the welding current will enter the electrode wire at this last point of contact. This is not only desirable but in some instances it is essential inasmuch as the high currents employed would heat the welding wire excessively by resistance heating if the current has to traverse a long length of it. We have found that the internal diameter of the contact element and wire guide should not exceed the wire diameter plus 20 per cent, and that this internal diameter should be maintained for a length of at least 25 times the diameter. Good design practice for a contact tube for use with a $\frac{1}{16}$-inch diameter wire is a .070-inch bore and a length of 3½ inches.

This introduces the next requirement of the contact tube which is that it terminate within a very definite locus within the nozzle. As previously described, an essential to the welding process is a non-turbulent gas shield for substantially completely excluding air from the arc. Non-turbulent flow disintegrates a short distance beyond the nozzle face, so that the longitudinal spacing of the nozzle face with respect to the arc is limited. Stated another way, the wire cannot project more than a short distance beyond the nozzle face or the arc will be outside the range of projection of the non-turbulent gas shield. If then the contact tube were to extend outside the nozzle, the terminal portion of the electrode (last point of electrical contact to arc) would be so short that any inadvertent variation in the welding conditions that would produce increased burn-off would result in damage to the contact tube. This situation would occur, for instance, when the operator inadvertently moves the gun closer to the workpiece while welding. On the other hand, if the contact tube terminates too far back within the nozzle, the terminal portion of the electrode is substantially increased, so that much of the electrical energy is spent in heating the wire rather than in penetrating the workpiece. As a result the arc has little penetrating power, and the electrode metal deposits on top of the workpiece without adequate fusion, which results in an unsatisfactory weld. Proper control of the terminal portion is the difference between a good and an unsatisfactory weld in the welding of stainless steel and like materials having substantial electrical resistance. However, common to all metals is the disadvantage that, the larger the free length of wire electrode past the end of the contact tube, the more opportunity there is for eccentricity as it emerges from the nozzle due to the residual curvature of the wire. This results in decreased arc shielding efficiency. It has been found that best results are obtained when the contact tube terminates within the nozzle and not more than ¾ inch back of the nozzle face.

The contact tube 56 may be secured to block 42 by other means than the threads illustrated, but the structure is preferably such that the contact tube may be readily removed and replaced, either because it is worn or damaged, or so it may be replaced by a tube of different inside diameter to adapt the gun for use with a different size of electrode wire.

At the point where the electrode 5 enters the fitting 11, a bushing 60 of soft rubber or the like is held by a plug 61 so as to insure a gas-tight connection and prevent contamination of the shielding gas by air from the atmosphere. Further, since the inert gas is admitted under superatmospheric pressure to the fitting 11, any leakage around bushing 60 will be inert gas "out" rather than air "in," thereby additionally preventing contamination of the shielding gas. A connector 62 on the conduit 12 is held to the fitting by a cap 63 affording a gas-tight joint. The internal diameter of the fitting 11, as well as that of the conduit 12, is such as to allow the passage of gas around the electrode as the latter advances and, as hereinbefore indicated, the gas ultimately flows around the current pickup shoe 56 and is delivered at the nozzle 54 surrounding the electrode where it acts as a shield for the arc. For small diameter wires with low-mechanical resistance to buckling it is frequently desirable to use a close-fitting flexible conduit for the wire and a large surrounding hose for the gas in preference to the conduit 12 as shown. Such wire also necessitates the location of the feed rolls 8 near the fitting 11 to assure uninterrupted feeding.

The apparatus as described affords a simple and satisfactory apparatus for welding with a continuously-fed electrode and a supply of gas at the nozzle to shield the arc. It is relatively light and can be manipulated easily by the operator so that it is readily usable in any position to effect the welding operation. As will be apparent from inspection of the drawing (note particularly Fig. 2), the invention provides an inert gas shielded continuous feed metal arc welding gun having a common head means for conducting welding current to an inner wire nozzle and also conducting inner gas to an outer gas nozzle means including a gas cup, said common head means including a metal block 42 to which said wire nozzle is removably attached. The block is provided both with a wire passage in line with the wire passage in the wire nozzle and also with longitudinal inert gas supply passages leading to an annular space between the inner (wire) and outer (gas) nozzle means. Further, a back flow gas passage in which an inert gas back pressure is created is provided to prevent air from being entrained with the wire and entering the shielding gas flowing to the welding zone.

Various changes may be made in the apparatus as described without departing from the invention or sacrificing the advantages thereof.

We claim:

1. Apparatus for inert gas shielded depositing electrode metal arc welding comprising, a wire guide and contact tube for guiding and supplying current to a consumable depositing electrode fed continuously through said tube to an arc formed between the end of said electrode and a workpiece, a barrel surrounding said tube and spaced therefrom to form an unobstructed flow passage of substantially constant cross-sectional area terminating at its exit end in a nozzle orifice having a diameter of not less than 5 times the diameter of said electrode and extending rearwardly from said nozzle orifice a distance of at least five times the diameter of said nozzle orifice, and means for admitting an inert gas into the inlet end of said unobstructed passage, whereby a non-turbulent inert gas shield is formed about said arc to exclude air therefrom.

2. Apparatus according to claim 1 in which which the means for admitting the inert gas directs it axially into said unobstructed passage.

3. Apparatus for inert gas shielded depositing electrode metal arc welding comprising a tubular barrel and a nozzle attached thereto, a wire guide and contact element concentrically located within said barrel and nozzle, and forming therewith an annular gas passage, means for admitting electrode wire to said wire guide and contact element for continuous passage therethrough, means for admitting shielding gas to said annular gas passage for continuous delivery therefrom as an annular envelope surrounding the terminal portion of said electrode wire as it emerges from said wire guide and contact element, means for conducting welding current to said element for introduction therefrom into said continuously fed electrode, and gas flow controlling means in said annular gas passage, said gas flow controlling means being spaced upstream from the discharge face of said nozzle to provide an unobstructed flow passage from said flow controlling means to said nozzle discharge face of a length not less than five times the nozzle diameter at said discharge face, said nozzle diameter at said discharge face being not less than five times the diameter of said electrode wire.

4. A welding gun for inert gas shielded depositing electrode metal arc welding comprising a tubular barrel and a nozzle attached thereto, a wire guide and contact element concentrically located within said barrel and nozzle, and forming therewith an annular gas passage, means for admitting electrode wire to said wire guide and contact element for continuous passage therethrough, means for admitting shielding gas to said annular gas passage for continuous delivery therefrom as an annular envelope surrounding the terminal portion of said electrode wire as it emerges from said wire guide and contact element, means for conducting welding current to said element for introduction therefrom into said continuously fed electrode, and gas flow controlling means in said annular gas passage, said gas flow controlling means being spaced upstream from the discharge face of said nozzle to provide an unobstructed flow passage free from severe changes in direction and cross-sectional area from said flow controlling means to said nozzle discharge face of a length not less than five times the nozzle diameter at said discharge face, said nozzle diameter at said discharge face being not less than 3/8 of an inch and not less than five times the diameter of said electrode wire.

5. Apparatus for inert gas shielded depositing electrode metal arc welding comprising a tubular barrel and a nozzle attached thereto, a wire guide and contact element concentrically located within said barrel and nozzle, and forming therewith an annular gas passage, means for admitting electrode wire to said wire guide and contact element for continuous passage therethrough, means for admitting shielding gas to said annular gas passage for continuous delivery therefrom as an annular envelope surrounding the terminal portion of said electrode wire as it emerges from said wire guide and contact element, means for conducting welding current to said element for introduction therefrom into said continuously fed electrode, and gas flow controlling means in said annular gas passage, consisting of a disk-shaped element having axial flow gas passages uniformly spaced about the periphery thereof, said gas flow controlling means being spaced upstream from the discharge face of said nozzle to provide an unobstructed flow passage from said flow controlling means to said nozzle discharge face of a length not less than five times the nozzle diameter at said discharge face, said nozzle diameter at said discharge face being not less than five times the diameter of said electrode wire.

6. Apparatus for inert gas shielded depositing electrode metal arc welding comprising a tubular barrel and a nozzle attached thereto, a wire guide and contact element concentrically located within said barrel and nozzle, and terminating within said nozzle not more than 3/4 inch from the discharge face of said nozzle and forming therewith an annular gas passage, means for admitting electrode wire to said wire guide and contact element for continuous passage therethrough, means for admitting shielding gas to said annular gas passage for continuous delivery therefrom as an annular envelope surrounding the terminal portion of said electrode wire as it emerges from said wire guide and contact element, means for conducting welding current to said element for introduction therefrom into said continuously fed electrode, and gas flow controlling means in said annular gas passage, said gas flow controlling means being spaced upstream from the discharge face of said nozzle to provide an unobstructed flow passage from said flow controlling means to said nozzle discharge face of a length not less than five times the nozzle diameter at said discharge face, said nozzle diameter at said discharge face being not less than five times the diameter of said electrode wire.

7. Apparatus for inert gas shielded depositing electrode metal arc welding comprising a tubular barrel and a nozzle attached thereto, a tubular wire guide and contact element concentrically located within said barrel and nozzle and terminating within said nozzle not more than 3/4 inch from the discharge face of said nozzle, means for admitting electrode wire to said wire guide and contact element for continuous passage therethrough, means for admitting shielding gas to said annular gas passage for continuous delivery therefrom as an annular envelope surrounding the terminal portion of said electrode wire as it emerges from said wire guide and contact element, means for conducting welding current to said element for introduction therefrom into said continuously fed electrode, and gas flow controlling means in said annular gas passage, said gas flow controlling means being spaced upstream from the discharge face of said nozzle to provide an unobstructed flow passage free from severe changes in direction and cross-sectional area from said flow controlling means to said nozzle discharge face of a length not less than five times the nozzle diameter at said discharge face, said nozzle diameter at said discharge face being not less than five times the diameter of said electrode wire, wherein said tubular wire guide and contact element has an inside diameter not more than 20 per cent greater than the electrode wire diameter for a length of not less than 25 times said electrode wire diameter.

8. Apparatus for inert gas-shielded depositing electrode metal arc welding comprising, a tube for guiding a consumable depositing electrode fed continuously through said tube to an arc formed between the end of said electrode and a workpiece, a barrel surrounding said tube and spaced therefrom to form an inert gas flow passage which is substantially free of turbulence-creating flow obstructions, said flow passage terminating in a nozzle exit portion having an exit orifice the diameter of which is about 8 or more times the electrode diameter, said flow passage extending rearwardly from said nozzle exit portion a distance of about 5 or more times the diameter of said nozzle exit orifice, and means for admitting an inert gas into the inlet end of said flow passage, whereby a non-turbulent inert gas-shield is formed about said arc to exclude air therefrom.

ALBERT MULLER.
GLENN J. GIBSON.

REFERENCES CITED

The following references are of record in the file of this patent:

UNITED STATES PATENTS

| Number | Name | Date |
| --- | --- | --- |
| 1,508,711 | Noble | Sept. 16, 1924 |
| 1,746,207 | Alexander | Feb. 4, 1930 |
| 2,014,226 | Catlett | Sept. 10, 1935 |
| 2,307,553 | Weller | Jan. 5, 1943 |
| 2,402,937 | Stringham | June 25, 1946 |
| 2,468,806 | Pilia | May 3, 1949 |
| 2,468,808 | Drake | May 3, 1949 |

FOREIGN PATENTS

| Number | Country | Date |
| --- | --- | --- |
| 295,600 | Germany | Oct. 12, 1915 |